US009258686B2

(12) United States Patent (10) Patent No.: US 9,258,686 B2
Zelson et al. (45) Date of Patent: Feb. 9, 2016

(54) MEDIA SHARING COMMUNITY

(75) Inventors: Richard M. Zelson, New York, NY (US); Joseph A. Sorisi, Old Brookville, NY (US)

(73) Assignee: RMZ DEVELOPMENT LLC, New York, NY (US)

( * ) Notice: Subject to any disclaimer, the term of this patent is extended or adjusted under 35 U.S.C. 154(b) by 0 days.

(21) Appl. No.: 13/135,687
(22) Filed: Jul. 13, 2011

(65) Prior Publication Data
US 2012/0015613 A1 Jan. 19, 2012

Related U.S. Application Data

(60) Provisional application No. 61/364,375, filed on Jul. 14, 2010, provisional application No. 61/450,863, filed on Mar. 9, 2011, provisional application No. 61/516,287, filed on Mar. 31, 2011.

(51) Int. Cl.
*H04B 1/38* (2015.01)
*H04W 4/20* (2009.01)
*H04W 4/02* (2009.01)

(52) U.S. Cl.
CPC ............... *H04W 4/206* (2013.01); *H04W 4/02* (2013.01)

(58) Field of Classification Search
CPC ......... H04L 67/04; H04L 67/02; H04L 67/06; H04L 29/06; H04L 51/16; H04L 51/32; H04L 63/205; H04L 67/18; H04L 67/20; H04L 67/34; H04L 12/581; H04L 12/587
USPC ....................................................... 455/90.1
See application file for complete search history.

(56) References Cited

U.S. PATENT DOCUMENTS 8,856,680 B2 * 10/2014 Jung ..................... G06F 9/4443
 715/718
2004/0068541 A1 * 4/2004 Bayassi et al. ................ 709/204

(Continued)

OTHER PUBLICATIONS

PCT International Search Report for International Application No. PCT/US2011/001213 dated Nov. 21, 2011.

(Continued)

*Primary Examiner* — Ajibola Akinyemi
(74) *Attorney, Agent, or Firm* — Kelley Drye & Warren, LLP

(57) ABSTRACT

The present invention enables a user to share his/her listening experience selectively with others without sharing headphones and without disturbing others who do not want to listen. In a preferred embodiment, a first listener can accomplish this by storing in a Portable Electronic Device or similar device a library of listening experiences, listening to one of the listening experiences, and while listening to that one listening experience streaming the one listening experience to at least one other Portable Electronic Device or similar device. A second listener at the other Portable Electronic Device can then listen to the same listening experience as the first listener at the same time. It is expected that the listening experiences will typically be songs or other music but the invention may be practiced with any type of audio content. The first listener may also create a playlist of the listening experiences in the library and make the playlist available to others. Others may use the playlist to access the library and listen to one or more listening experiences stored in the library. Also, utilizing the same interface and communication methodologies as described above, the technology platform detailed in this application can be used for commercial purposes to stream location based content, audio and otherwise, to a connected network of Portable Electronic Devices. Commercial uses of this functionality include providing commercial establishments with the ability to create synchronous (users come into a stream at the exact point that it is being streamed in real time) and or asynchronous (users can select and start a transmission from the beginning) featured channels (location based) where they can stream any self created or otherwise authorized content to other Portable Electronic Devices in their range.

25 Claims, 12 Drawing Sheets

(56) References Cited

U.S. PATENT DOCUMENTS

| | | | |
|---|---|---|---|
| 2005/0286546 A1* | 12/2005 | Bassoli | G11B 27/002 370/432 |
| 2007/0005503 A1 | 1/2007 | Engstrom et al. | |
| 2007/0297426 A1 | 12/2007 | Haveson et al. | |
| 2008/0162668 A1* | 7/2008 | Miller | H04L 65/40 709/219 |
| 2008/0250126 A1* | 10/2008 | Stohr et al. | 709/221 |
| 2008/0305738 A1* | 12/2008 | Khedouri | G06F 17/30038 455/3.06 |
| 2010/0257251 A1* | 10/2010 | Mooring et al. | 709/216 |
| 2014/0115476 A1* | 4/2014 | Fink | G06F 17/3082 715/720 |
| 2014/0223025 A1* | 8/2014 | Heinmiller | G11B 27/10 709/231 |

OTHER PUBLICATIONS

PCT Written Opinion of the International Searching Authority for International Application No. PCT/US2011/001213 dated Nov. 21, 2011.

* cited by examiner

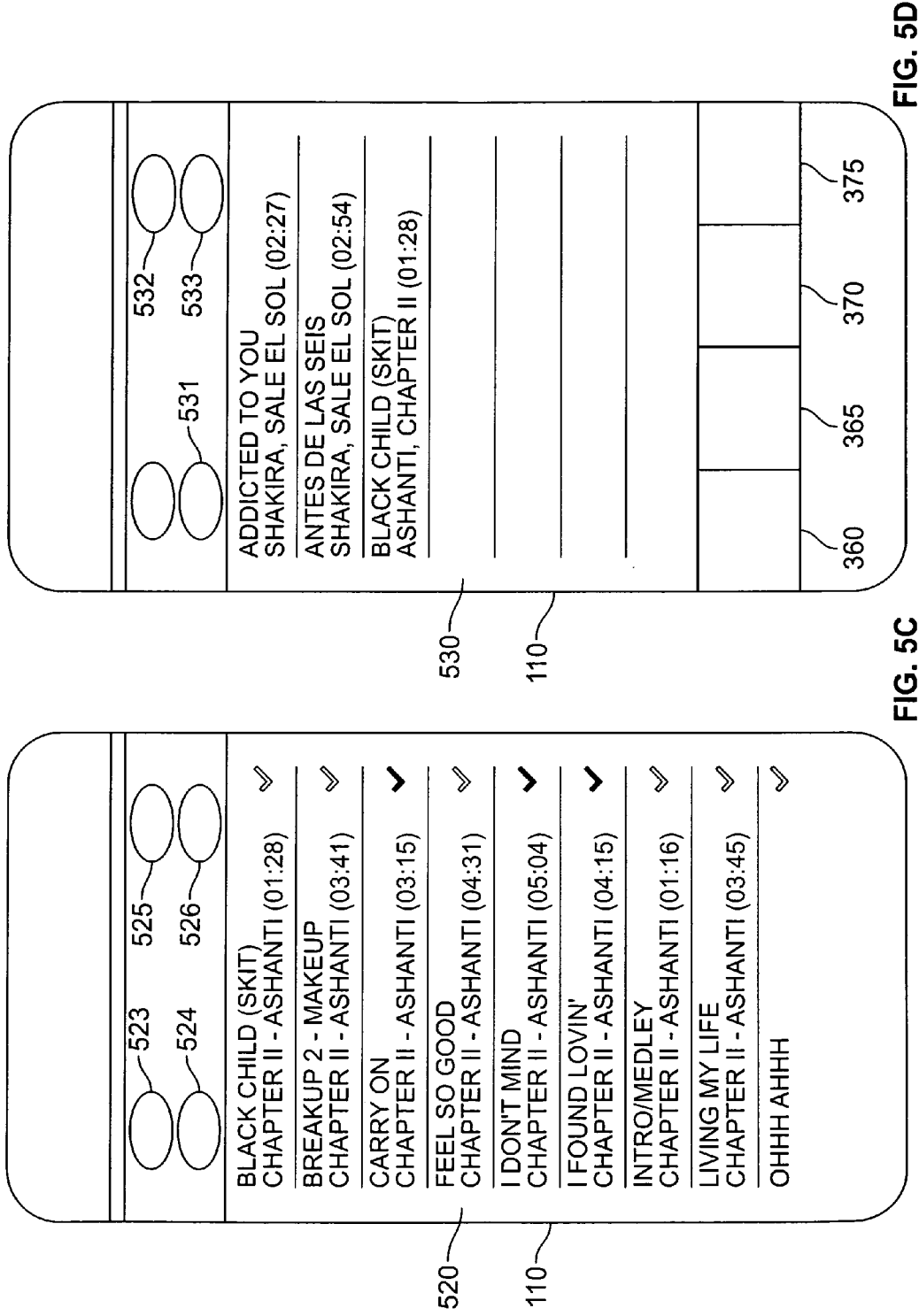

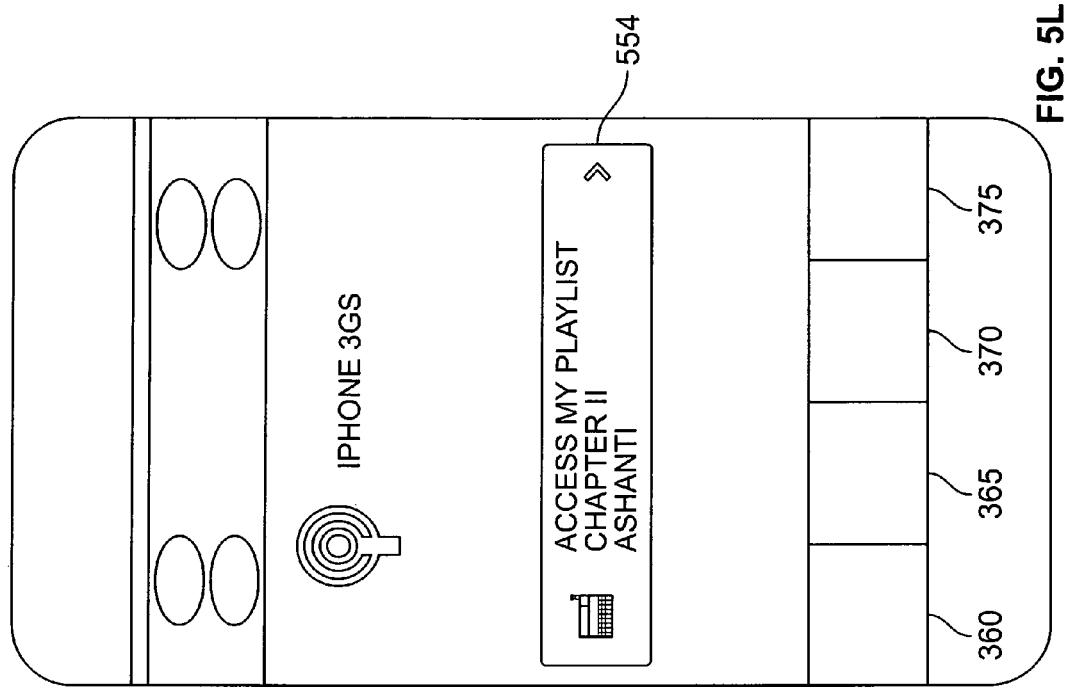
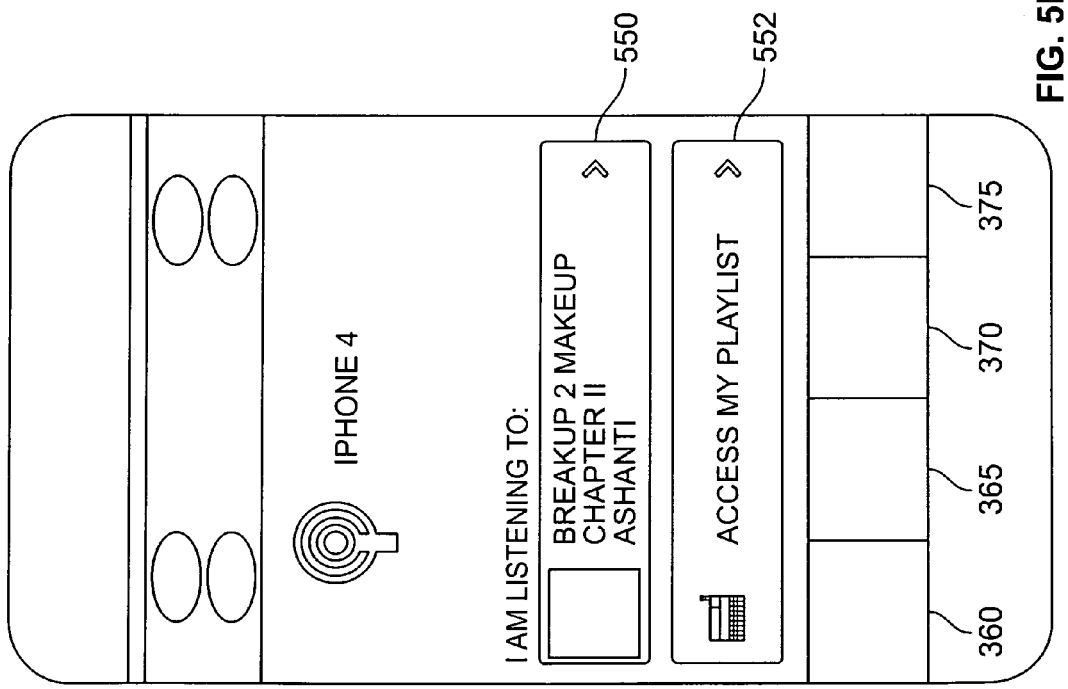
FIG. 5K
FIG. 5L

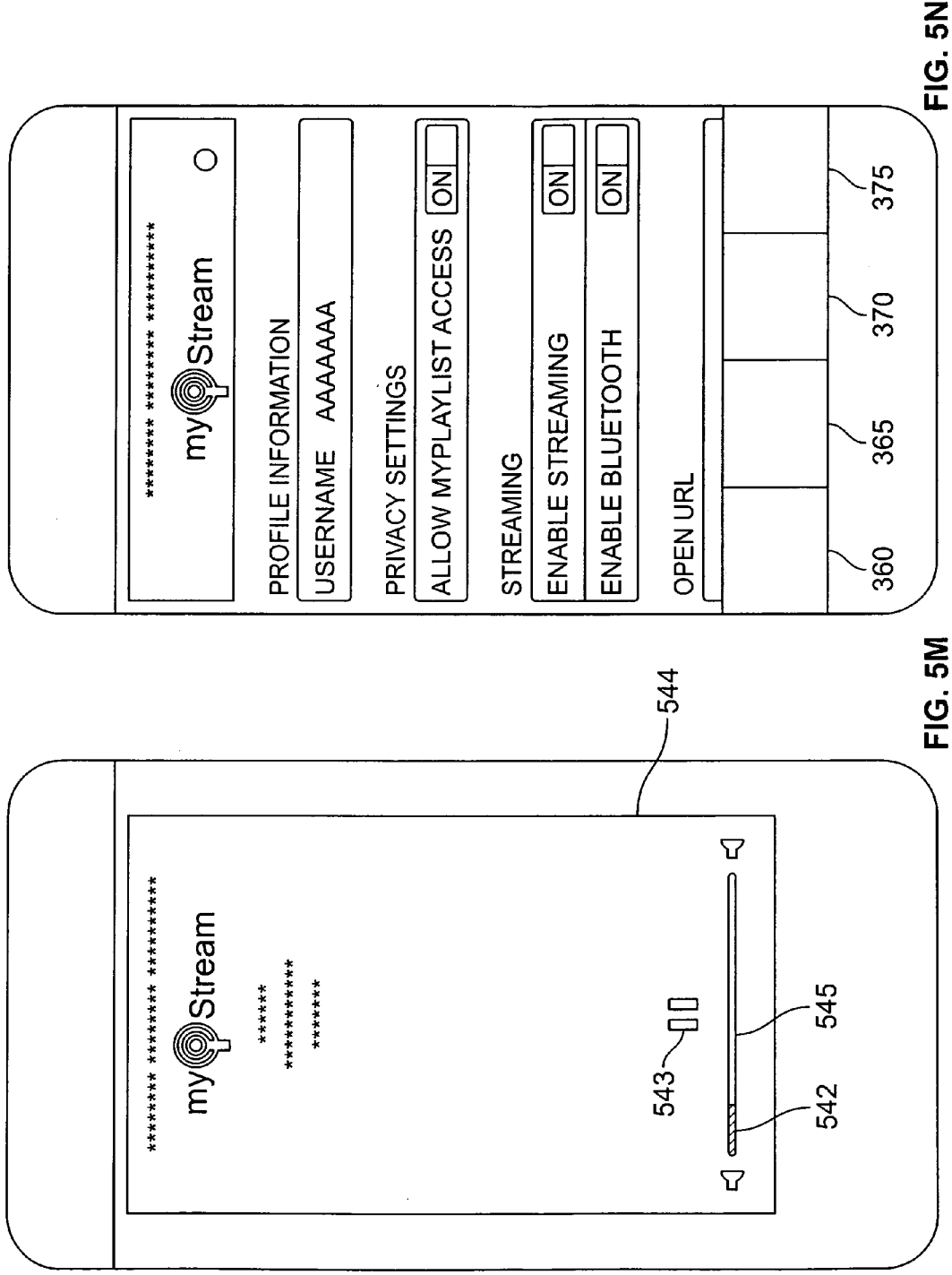

MEDIA SHARING COMMUNITY

CROSS-REFERENCE TO RELATED APPLICATIONS

This application claims the benefit of provisional application Ser. No. 61/364,375, filed Jul. 14, 2010, provisional application Ser. No. 61/450,863, filed Mar. 9, 2011, and provisional application Ser. No. 61/516,287, filed Mar. 31, 2011, each of which applications is incorporated herein in its entirety.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTING APPENDIX

Submitted herewith are two identical copies (Copy 1 and Copy 2) of a compact disc (Disc 1) containing computer program listings that are hereby incorporated by reference in their entirety in the present application. Identification of the files on Disc 1, their sizes and their dates of last modification are set forth in Exhibit 1 of the transmittal letter that accompanies Disc 1.

BACKGROUND

This relates to media sharing communities and to methods, apparatus and software for supporting such communities. The invention is described in detail in the context of communities for sharing audio information such as music using Portable Electronic Devices and the like; but the invention may also be practiced to share other information and/or using other modalities. The sharing of location based audio streams and or other digital files can be used for both personal and commercial purposes using the described methods, apparatus and software networks for supporting such functionalities.

Portable Electronic Devices such as the iPhone and the Android and other consumer electronic products such as iPod touches and iPads are widely used to listen to music that is stored in the listener's Portable Electronic Device or other product and/or as it is streamed from a source such as the iTunes store. We will refer to these and all other devices capable of supporting our functionality as Portable Electronic Devices. Often, the listener uses a set of headphones to listen to the music. If the listener desires to share his/her listening experience, choices are limited. The use of speakers probably is not feasible because the headphones are likely being used because the listener is in a public place where others do not want to listen to the music. And sharing the headphones at best creates an awkward situation in which two listeners are tethered together by the signal leads to the headphones.

SUMMARY

In one embodiment, the present invention enables a user to share his/her listening experience selectively with others without sharing headphones and without disturbing others who do not want to listen.

In a preferred embodiment of the invention, a first listener can accomplish this by storing in a Portable Electronic Device a library of listening experiences, listening to one of the listening experiences, and while listening to that one listening experience streaming said listening experience to at least one other Portable Electronic Device. A second listener at the other Portable Electronic Device can then listen to the same listening experience as the first listener at the same time. It is expected that the listening experiences will typically be songs or other music but the invention may be practiced with any type of audio content.

Numerous variations may be practiced in the preferred embodiment. For example, the first listener may create a playlist of the listening experiences in the library and make the playlist available to others. Others may use the playlist to access the library and listen to one or more listening experiences stored in the library and identified by the playlist.

Utilizing the same interface and communication methodologies as described herein, the technology platform can be used for commercial purposes to stream location based content, audio and otherwise, to a connected network of Portable Electronic Devices. Commercial uses of this functionality include providing commercial establishments with the ability to create a featured channel (location based) where they can stream any self created or otherwise authorized content to other Portable Electronic Devices in their range.

Commercial applications of said invention fall into two core categories: situations where users want to be able to start a transmission from the intended beginning of the file and situations where a user would like to come into a transmission at the exact point where the live transmission is being streamed in real time. Examples of the former include using the technology platform in a museum where a user would like to hear the audio description of an exhibit from the beginning, or going on a walking tour of a city and hearing a description of the landmark that they are near. Those functionalities utilize our asynchronous streaming technology described in greater detail below. Examples of the later include hearing the live audio feed of a TV station at a fitness club directly on a user's Portable Electronic Device, hearing the live (real time) audio of a Broadway play or movie (location based) in real time, hearing a featured audio channel at a department store or local coffee shop, or hearing the live (real time) audio of a lecture.

BRIEF DESCRIPTION OF THE DRAWINGS

These and other objects and advantages of the present invention will be apparent to those of ordinary skill in the art in view of the following detailed description in which.

DETAILED DESCRIPTION

Figure 1:
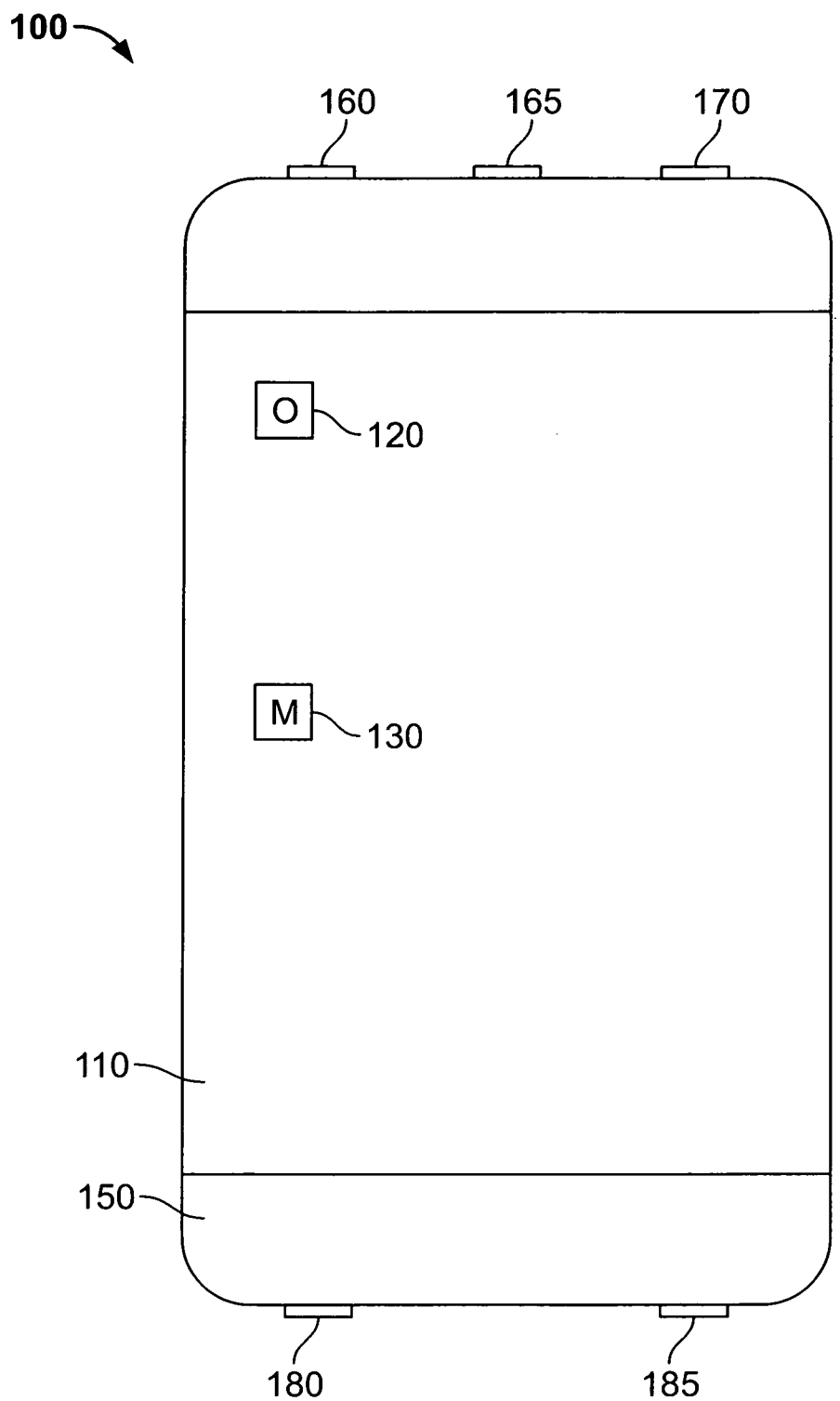
FIG. 1 depicts a typical Portable Electronic Device that can be used in the practice of the invention.

FIG. 1 depicts the front side of a typical Portable Electronic Device 100 that may be used in the practice of the invention.

The Portable Electronic Device includes a touch sensitive display screen (or "touch screen") 110 mounted in a case 150. In the edge of the case at one end are a first microphone 160, a headphone jack 165 and an on/off switch 170. In the edge of the case at the opposite end are a second microphone 180 and a speaker 185. Keystrokes may be input to the Portable Electronic Device through a keyboard displayed on the touch screen and messages may be displayed on the touch screen.

Various software applications (or Apps) come pre-loaded in some Portable Electronic Devices and additional Apps may be downloaded to the Portable Electronic Device from a variety of sources. In the case of Portable Electronic Devices sold by Apple, Inc such as the iPhone and other products such as iPod Touches and iPads, Apps may be obtained from Apple's iTunes Store. In one or more modes of operation, icons representing the Apps that are loaded in the Portable Electronic Device can be displayed on touch screen 110; and the software application can be activated by touching the appropriate icon. For purposes of illustration, FIG. 1 depicts an icon 120 that is used to obtain local weather information and an icon 130 labeled "MyStream" that is used to activate the software of the present invention. As will be appreciated, icon 130 is only illustrative of one way to activate the software. Other ways such as keyboard entries may also be used; and other designs and labeling may be used on the icon.

Figure 2:
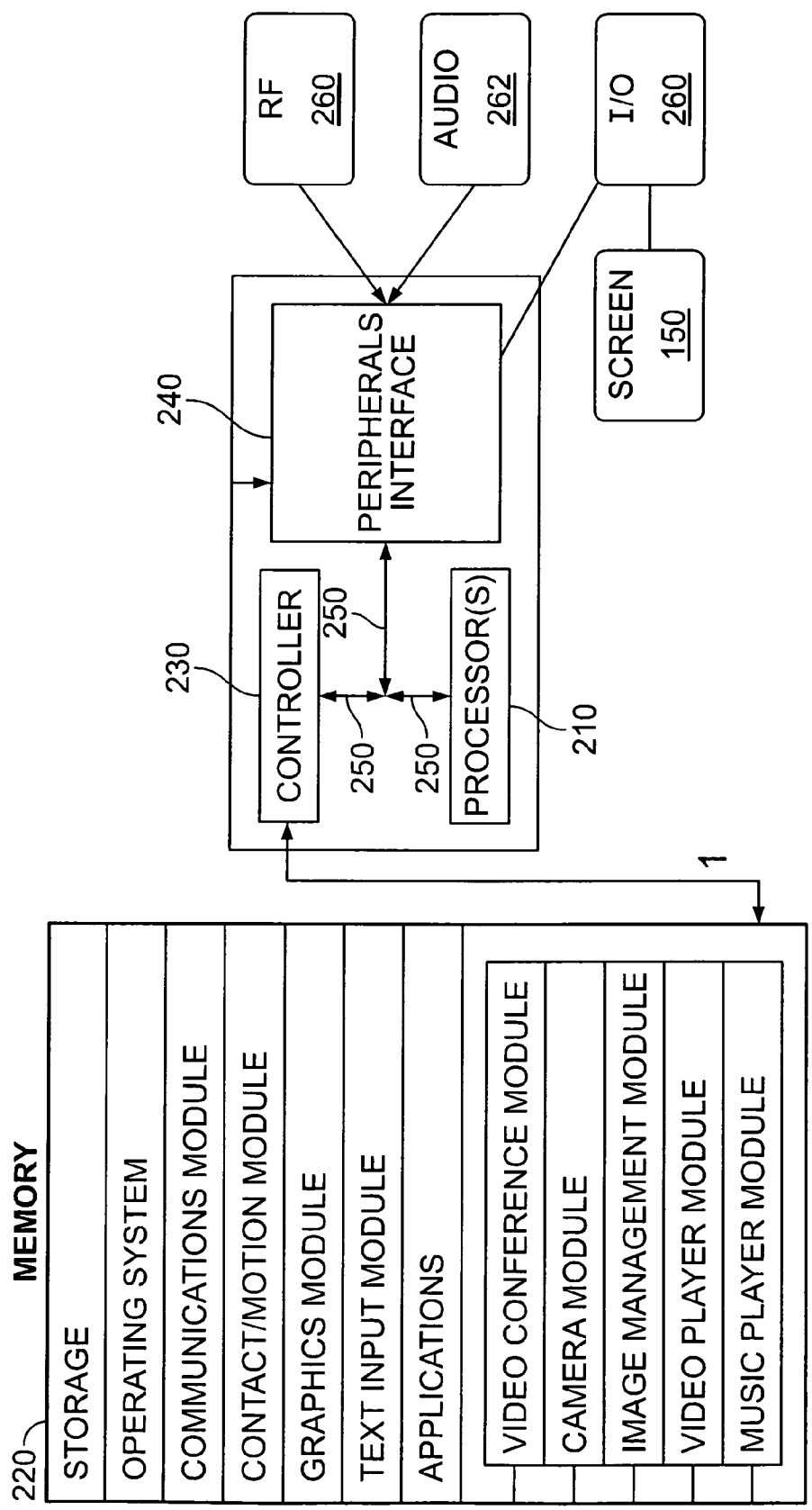
FIG. 2 is a block diagram depicting several components of a Portable Electronic Device that may be used in the practice of the invention.

As is well known, Portable Electronic Devices have a wide range of capabilities. Some of these capabilities are depicted in the block diagram of FIG. 2. Within case 150 are one or more computer processors 210, a memory 220, a memory controller, 230 and a peripherals interface 240 which are interconnected by a communications bus 250. The peripherals interface connects to several components including radio frequency (RF) circuitry 260, audio circuitry 262, and an input/output (I/O) system 264 that includes touch screen 150. Memory 220 may include high speed random access memory and may also include flash memory and one or more magnetic disk drive storage devices. Memory 220 stores the operating system for the Portable Electronic Device, various modules to control certain of its operations, and various software applications that are either pre-loaded or installed by the Portable Electronic Device's user. Some of these are depicted in FIG. 2. Of particular note, memory 220 includes an audio library. A more extensive listing of illustrative software is set forth in FIGS. 1A and 1B of U.S. Pat. No. 7,479,949, which is incorporated herein by reference in its entirety.

Portable Electronic Devices have extensive communication capability using an antenna secured within the case. Of particular note, Portable Electronic Devices can connect to one or more wireless telephone networks. They may also connect to Bluetooth® transceivers using Bluetooth® technology; and they may also connect with other transceivers using Wireless Fidelity (Wi-Fi) (e.g., 808.11 protocols such as IEEE 802.11a, IEEE 802.11b, IEEE 802.11g, and/or IEEE 802.11n). Further information about typical Portable Electronic Device communication capabilities is found in the above-referenced U.S. Pat. No. 7,479,949. See, for example, FIGS. 1A and 1B and Col. 10, line 53 to Col. 11, line 20.

As described above, in one embodiment, software for practicing the invention is made available as a software application (or App) and can be downloaded by a user to his/her Portable Electronic Device from a source such as the iTunes Store. In one embodiment, when such software is installed in the user's Portable Electronic Device an icon representing that software such as icon 130 is made available for display on touch screen 110 along with icons representing other Apps stored in the same Portable Electronic Device. A user may activate the software of the present invention by touching icon 130. Upon doing so, a display 310 such as that depicted in FIG. 5G appears on touch screen 110.

Figure 3:
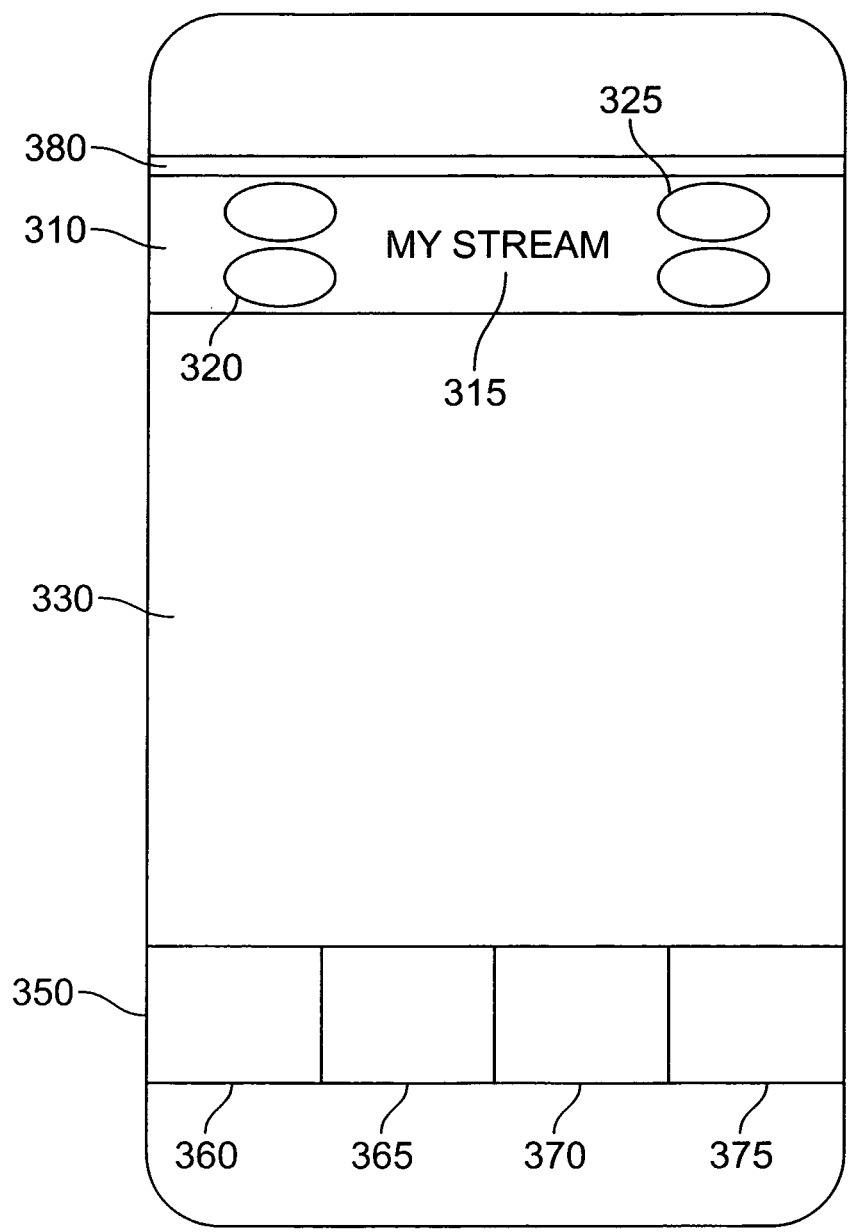
FIG. 3 depicts a user interface for use in practicing the invention.
Figure 5B:
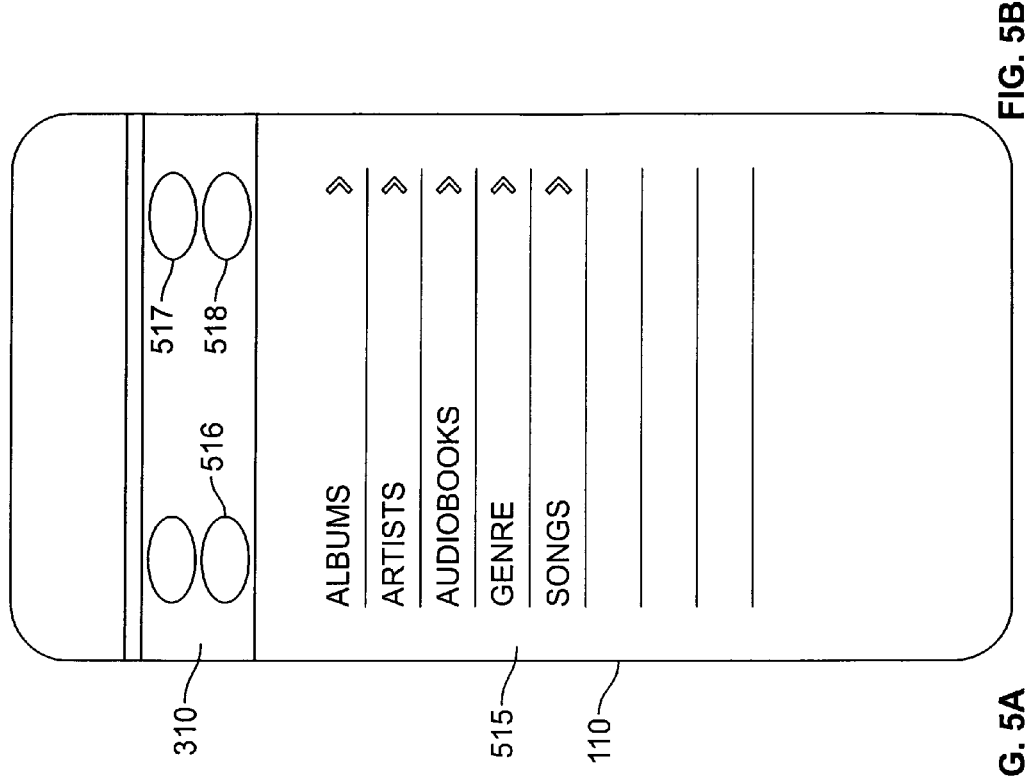
FIGS. 5A-5O depict illustrative user interfaces in the practice of an illustrative embodiment of the invention; and Throughout FIGS. 3, 4 and 5A-5O, the same numbers are used to represent the same or similar components.
Figure 5A:
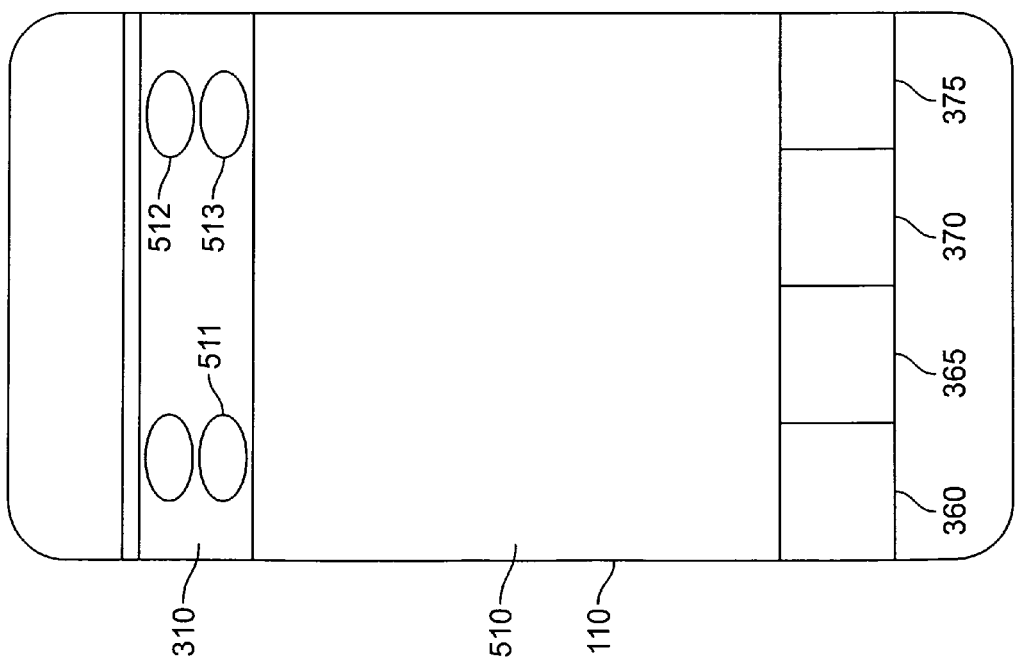

FIG. 3 depicts the general format of an illustrative embodiment of the user interface used in the practice of the invention. Specific instances of the user interface are depicted in FIGS. 5A-5O. The interface includes an upper margin 310, an intermediate space 330 and a lower margin 350. Intermediate space 330 is used for the display of graphic information, text and messages as well as certain soft keys as described more fully below. Illustratively, immediately above the upper margin is a display line 380 that indicates the name of the wireless service provider and the time. The upper margin includes at 315 the name of the App, which illustratively is myStream, and one or more soft keys 320, 325 that may be used as described below to perform functions such as adding or deleting items identified in intermediate space 330. Lower margin 350 contains four softkeys 360, 365, 370, and 375 that in the present example are labeled MyStream, Streamers, MyPlaylist and MyProfile, respectively. MyStream key 360 is used to access a home screen such as that illustrated in FIGS. 5H and 5I below; Streamers key 365 is used to provide a listing of users of the MyStream App within the network as illustrated in FIGS. 5I-5K below; MyPlaylist key 370 displays the MyPlaylist screen such as that illustrated in FIG. 5F below; and the MyProfile key 375 displays user settings such as those illustrated in FIGS. 5N and 5O below.

Figure 4:
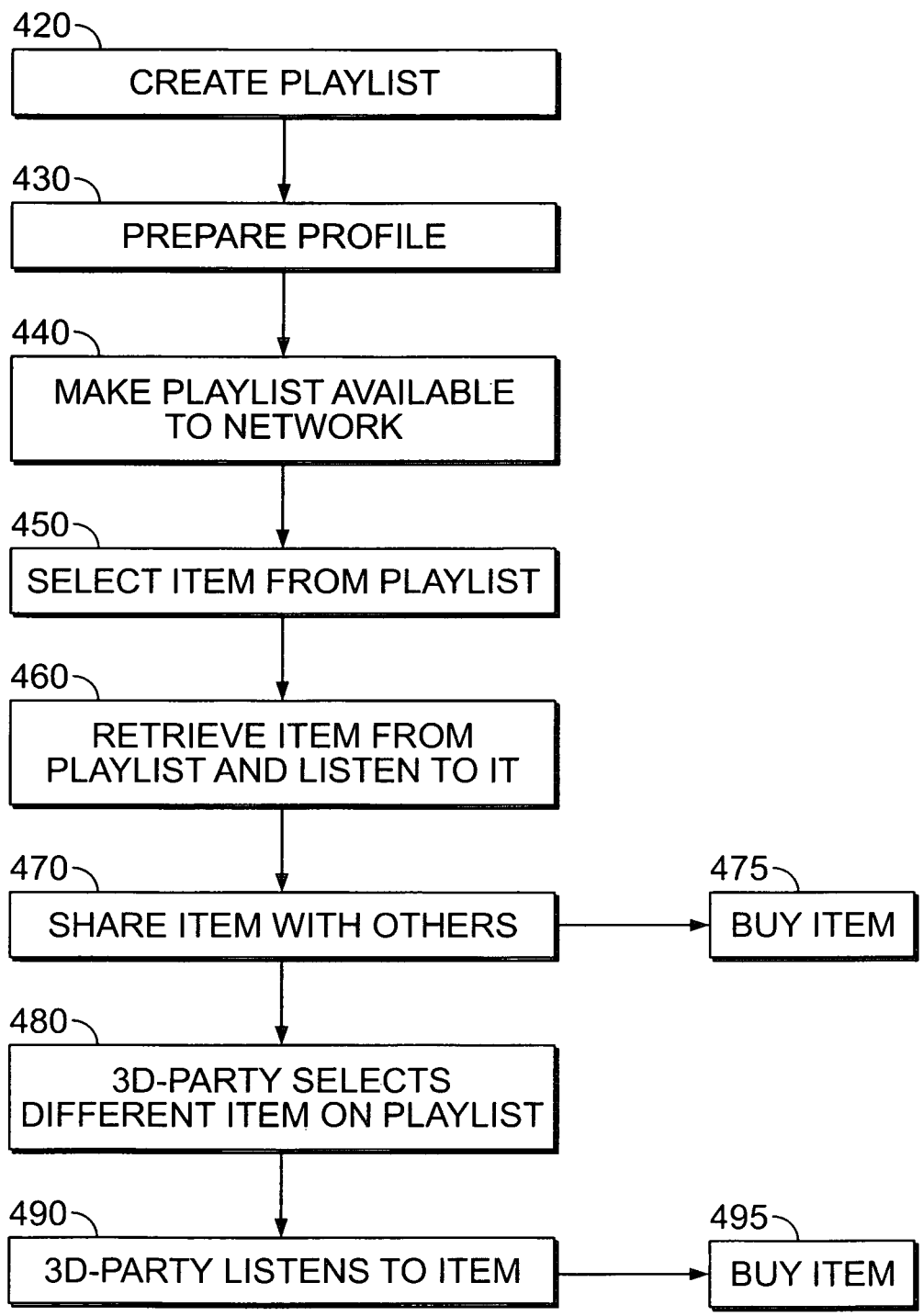
FIG. 4 is a flowchart depicting an embodiment of the invention.

FIG. 4 is a flowchart depicting the overall operation of an illustrative embodiment of the invention. Illustratively, the software is made available for purchase and download from a source such as the iTunes Store as described above. Upon downloading the software, the user is invited by a screen displayed on the touch screen 110 to begin the process as at step 420 of creating a playlist of listening experiences stored in his/her audio library in his/her Portable Electronic Device. At this point, the user is likely to complete a profile at step 430 that sets options on access to the listening experiences identified in MyPlaylist as well as methods of communication such as Bluetooth® and availability of streaming. If the user approves of access to his/her listening experiences, MyPlaylist is made available at step 440 to everyone connected to the same communication network.

When a user wants to listen to one of the listening experiences identified in a MyPlaylist he/she created, he/she selects that experience from the list as at step 450. At step 460, the selected listening experience is read from memory in the Portable Electronic Device in the form of electromagnetic signals and these signals are converted by the audio circuitry of the Portable Electronic Device to audio signals that are supplied to the user through the speaker of the Portable Electronic Device or through headphones connected to the headphone jack of the Portable Electronic Device. The electromagnetic signals are also transmitted to others from an appropriate Portable Electronic Device transmitter if the user had indicated a willingness to share his/her listening experience in the profile completed at step 430. Accordingly, in this case, anyone connected to the same communication network can listen to the same listening experience at step 470 by touching the Streamers Tab 365 on his/her Portable Electronic Device and then selecting the streamer who is playing that listening experience. In a preferred embodiment of the invention, the listening experiences are synchronized by providing the same electromagnetic signal to all listeners at the same time so that everyone is listening to the same experience at substantially the same point in time. As a result, a listener will ordinarily not hear the entire listening experience when he/she first begins listening because he/she will probably access the listening experience mid-file. He/she will only hear that portion of the listening experience that remains to be streamed at the time the listener selects that listening experience. However, after the initial connection is made, it is likely that users will be able to hear entire streamed listening experiences from the beginning since they have already made the connection to the other listener's device and subsequent streamed experiences will not have to start mid transmission.

In a preferred embodiment, each listener to a streaming listening experience is offered an opportunity at step 475 to purchase a copy of the listening experience from the iTunes store or some other source. Advantageously, a listener can initiate such a purchase by touching a "BUY" soft key on the listener's Portable Electronic Device.

Alternatively, at step 480, someone may select from MyPlaylist a different listening experience from that being listened to by the first user. In that case, the different listening experience is provided at step 490 ordinarily starting with the beginning of the experience. In some instances, it may be desirable to limit the time duration of the listening experience that is provided to avoid copyright issues. In a preferred embodiment, each listener is offered an opportunity at step 495 to purchase a copy of the listening experience from the iTunes store or some other source. Advantageously, a listener can initiate such a purchase by touching a "BUY" soft key on the listener's Portable Electronic Device.

FIGS. 5A-5O are a set of screenshots that depict various stages in the operation of the MyStream App as it is applied to the illustrative example of managing and playing a collection of music.

At the time the MyStream App is obtained from a source such as the iTunes Store, the user has not had the opportunity to establish his/her playlist or profile. Accordingly, these are the first order of business. Upon touching the MyStream icon 130 on touch screen 110, the user is presented with the main screen depicted in FIGS. 5G and 5H. In the bottom margin 350 of FIGS. 5G and 5H are the MyStream, Streamers, MyPlaylist and MyProfile keys 360, 365, 370 and 375.

Upon first touching the MyPlaylist soft key 360, a screen 510 such as that of FIG. 5A is presented on touchscreen 110. Screen 510 includes in upper margin 310 soft keys 511, 512 and 513 which are labeled Add Media, Playing and Edit, respectively, and in lower margin 350 the MyStream, Streamers, MyPlaylist and My Profile soft keys 360, 365, 370 and 375. Upon touching the MyPlaylist soft key again, a screen 515 such as that of FIG. 5B is presented on touchscreen 110. This screen provides a list of the various categories of listening experiences that are available in the audio library of the Portable Electronic Device. Screen 515 also provides soft keys 516, 517 and 518 labeled Select All, Cancel and Save, respectively.

To determine what is in any of these categories, the user touches that category on touch screen 110. If the number of entries in the audio library is relatively small, the user can select them all by touching Select All key 516. If the number of entries in the audio library is relatively large, some of the categories may be further sub-divided. For example, the Artists category may be sub-divided by the names of the individual artists.

As a result of this selection process, a list 520 such as that of FIG. 5C is ultimately displayed on touch screen 110. This list includes the names 521 of individual songs, a checkmark 522 indicating the selected/not selected status of the songs, and soft keys 523, 524, 525, 526, labeled Back, Select All, Cancel, and Save, respectively. Songs may be selected for the user's playlist by touching Select All soft key 524 or the name of the individual song. Selected songs are indicated by a filled in checkmark 522. Songs may be deselected by touching the name or the checkmark of the song to be deselected.

When the selection process is complete, the user touches Save soft key 526. At this point the selected songs are mapped into a MyStream MyPlaylist; and a list of those songs is generated. A list 530 of selected songs such as that depicted in FIG. 5D is then displayed on touch screen 110. Also presented with list 530 are soft keys 531, 532 and 533, labeled Add Media, Playing and Edit, respectively, and the MyStream, Streamers, MyPlaylist and MyProfile soft keys 360, 365, 370 and 375. The soft keys allow the user to play selections from MyPlaylist and to edit MyPlaylist. To play a selection, the user touches Playing soft key 532 and then touches the name of the song. To add a song, the user touches Add Media soft key 531. This returns the user to the screen of FIG. 5C where the selection process can be resumed. To edit the list, the user touches Edit soft key 534.

Figure 5E:
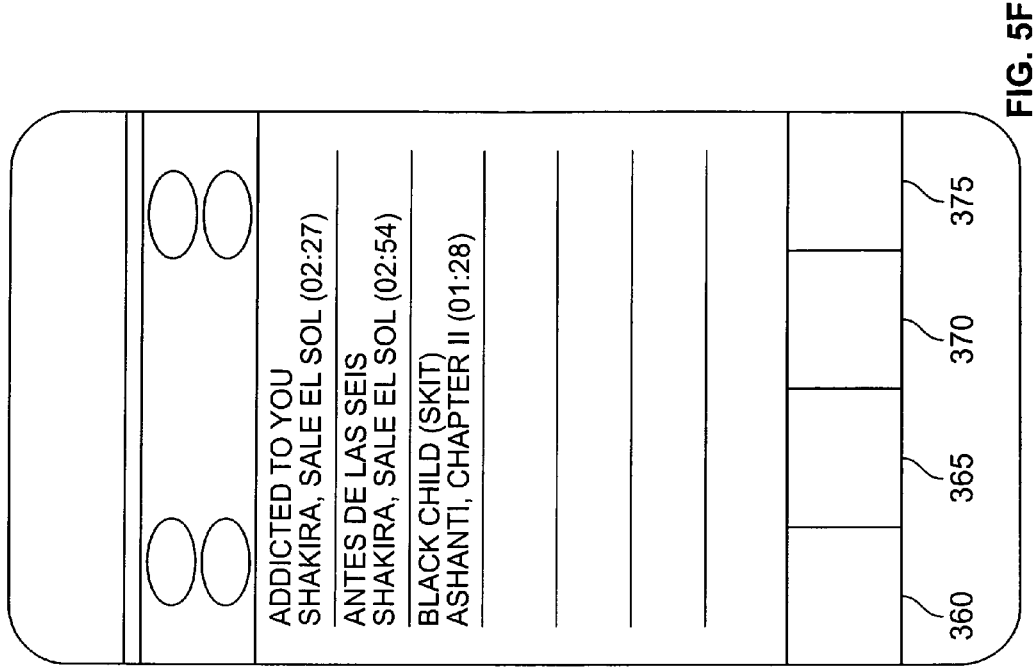

Touching Edit softkey 534 presents the user with screen 535 of FIG. 5E which displays the names of the songs on MyPlaylist along with a symbol 536 and soft keys 537, 538 and 539 that are labeled Delete All, Playing and Done, respectively. The entire MyPlaylist can be deleted by touching Delete All soft key 537. The order of songs in the list can be changed by touching symbol 536 alongside the name of any song and dragging the symbol to any other spot on the list and then releasing it. When the user is satisfied with the order of the songs, he/she can then touch Done soft key 539.

Figure 5F:
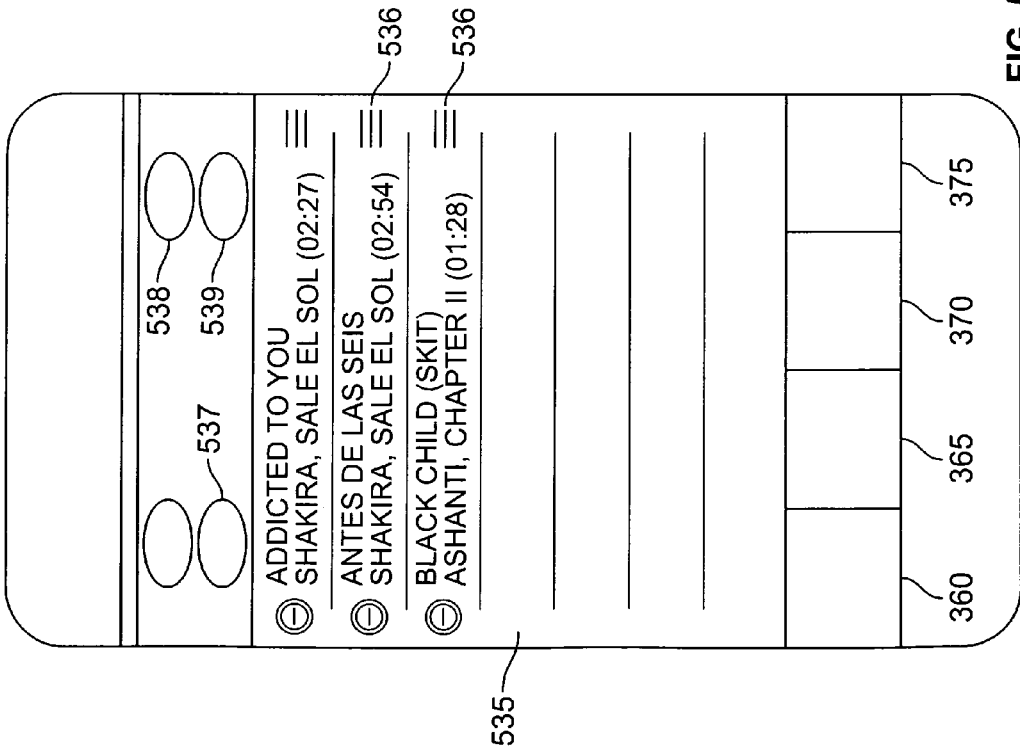
Figure 5H:
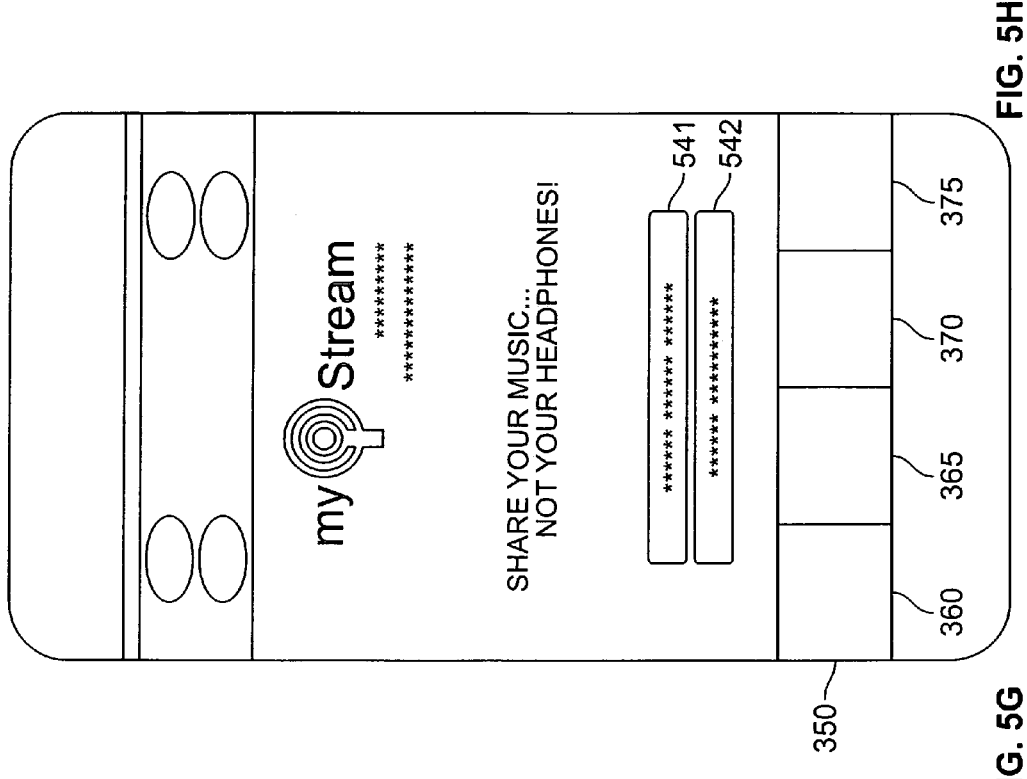
Figure 5G:
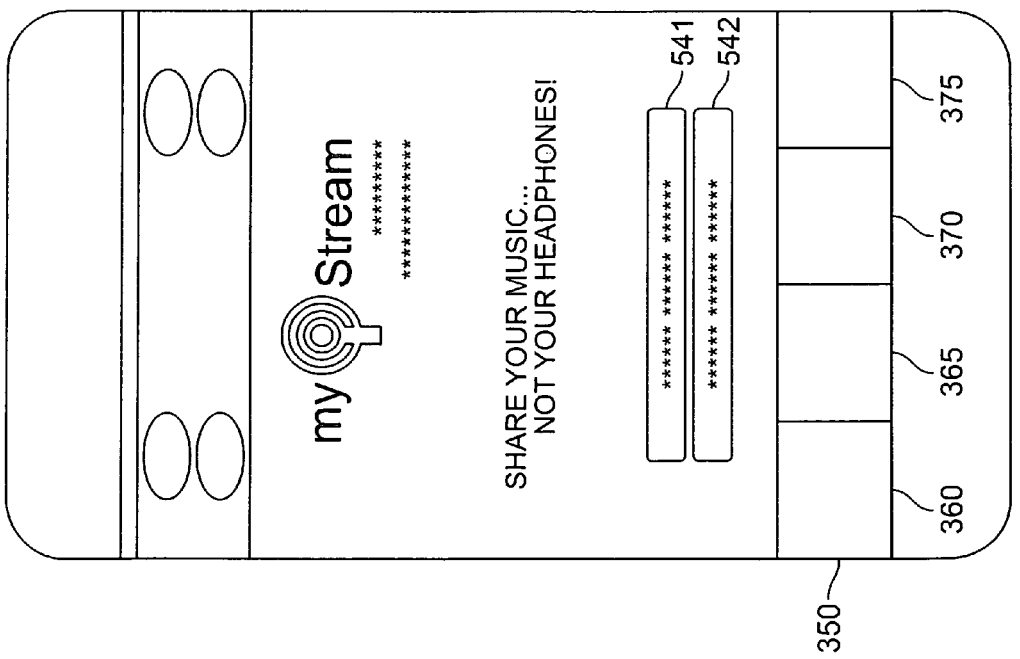
Figure 5I:
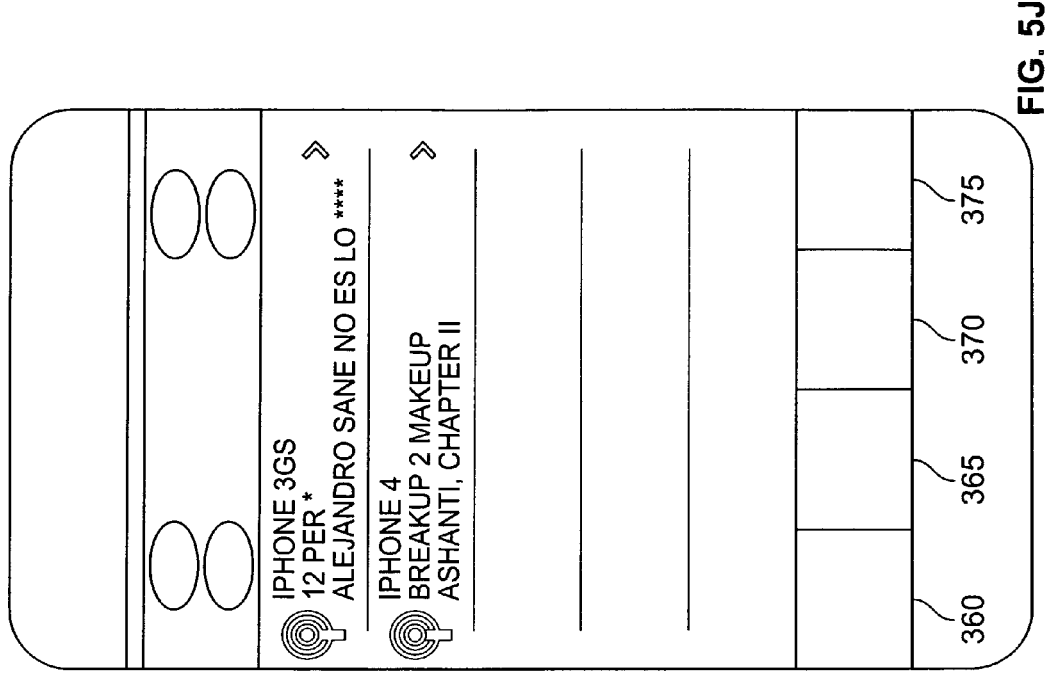
Figure 5J:
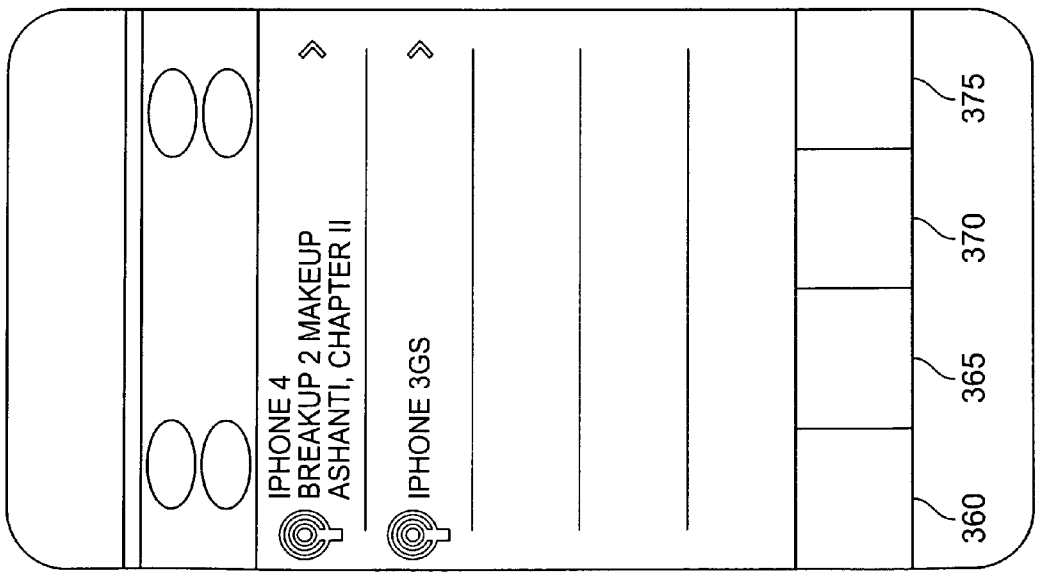
Figure 5O:
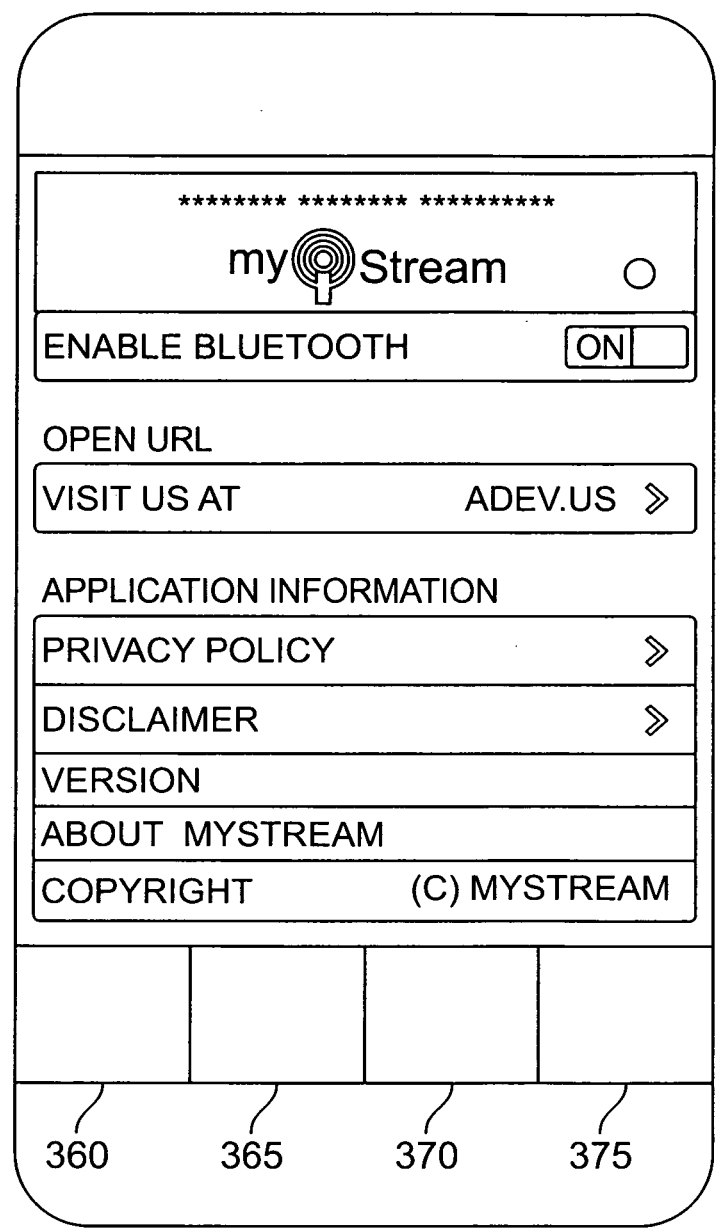

The display on touch screen 110 then becomes a list of selected audio files showing artist name, song name, album name and length of song as depicted in FIG. 5F. The screen also includes the MyStream, Streamers, MyPlaylist, and MyProfile soft keys 360, 365, 370, 375. This same screen is also presented to the user anytime the user touches the MyStream icon 130 after MyPlaylist has been created.

FIGS. 5G and 5H depict the main screen. The main screen may be accessed from any screen that displays a MyStream soft key 360 by touching that key. The main screen may also be accessed by touching icon 130 on touch screen 110 before MyPlaylist is created. In the bottom margin of FIGS. 5G and 5H are the MyStream, Streamers, MyPlaylist and MyProfile soft keys 360, 365, 370, 375. In the intermediate portion are a logo that identifies the software program and two soft keys 541 and 542. Soft key 541 controls whether the contents of MyPlaylist are made asynchronously available to others so that a third party can select and listen to a listening experience identified on a user's MyPlaylist even though the user is not listening to it. Soft key 542 controls whether streaming is enabled so that a listening experience then being listened to be a user is also made available by streaming to others. As shown in FIG. 5G, MyPlaylist can be accessed asynchronously (key 541) and a listening experience can be shared with others by streaming (key 542). Touching either soft key toggles its state. Thus, touching soft key 542 disables streaming and changes the label on the key to that shown in FIG. 5H. Touching soft key 542 in FIG. 5H re-enables streaming and changes the label on the key back to the label in FIG. 5G. Soft key 541 operates the same way in enabling asynchronous access to MyPlaylist. Optionally, one or more advertisements 543 may also be displayed on the main screen.

FIGS. 5I-5M depict operation of the streaming function. These screens provide a listing of everyone who is connected to the network regardless of whether they are currently streaming a listening experience to the network. If a song is being streamed, the song title, artist and album title are shown in the display area as is the case for iPhone 4 in FIG. 4I and as is the case for both streamers in FIG. 4J. Others connected to the network but not actively listening will only be identified. These listings may be accessed from any screen that displays Streamers soft key 365 by touching that key. In the bottom margin 350 of FIGS. 5I-5L are the MyStream, Streamers, MyPlaylist and MyProfile soft keys 360, 365, 370, 375. Optionally, one or more advertisements (not shown) may be included in the intermediate portion 330. FIGS. 5I-5M also depict the user interface in which commercial content will be visible and featured. Element 554 depicts the button that allows a user to determine file selection, including starting a chosen file at the beginning of a request from a listening user. In its current depiction it is shown as a button labeled "Access My Playlist" which is supported by our asynchronous streaming technology. It can be utilized for commercial uses such as in a museum where a user would like to hear the audio description of an exhibit from the beginning, or for a walking tour of a city where a user would like to hear a description of a landmark that he/she is near. Element 550 depicts the button that allows a user to access the live (real time) transmission of commercial content. This commercial use is in addition to its functionality as a personal music sharing tool described below since both functionalities operate utilizing the same technological methodologies. Such commercial uses include hearing the live audio feed of a TV station at a fitness club directly on a user's Portable Electronic Device or a featured audio channel at that fitness club location, hearing the live (real time) audio of a Broadway play or movie (location based), or hearing the live (real time) audio of a lecture. The following description of the invention will only depict the technology platform in terms of its use as a personal, location based, audio (primarily music) streaming application, since its commercial uses (described above) follow the same logical flow (and utilize the same technological communication methodologies and user interface) as described below except instead of commercial content being listed simply as another user's "Playlist" or "Live Stream" it is listed as a featured stream (within the "Streamers" tab shown as element 365) with unique content available from its "Live Stream" or in its "Playlist" tab.

Touching the identification of a particular streamer as displayed in FIG. 5I or 5J results in the display as depicted in FIG. 5K of the selected streamer's profile and soft keys 550, 552. Soft keys 550, 552 provide for connection to a listening experience being streamed and the streamer's playlist, respectively. If someone who is not actively listening is selected, his/her profile will be shown as depicted in FIG. 5L along with a soft key 554, for accessing his/her playlist.

If a new listener touches a soft key 550 that provides a connection to a listening experience then being streamed, the new listener's Portable Electronic Device connects to the streaming signal; and the listening experience begins for the new listener at whatever point the streaming signal has reached. Once one listening experience has finished, the next listening experience on the streamer's playlist will start. At the same time, the touch screen will provide a graphic such as an album cover or the dust jacket of an audio book related to the listening experience. One such example is shown in FIG. 5M. Information such a time elapsed, length of the selection and play list count is also displayed. Start, stop, back and volume controls are also displayed as soft keys 542, 543, 544 and 545, respectively.

FIGS. 5N and 5O depict the MyProfile screens. In the bottom margin 350 of FIGS. 5N and 5O are the MyStream, Streamers, MyPlaylist and MyProfile soft keys 360, 365, 370, 375. In the intermediate portion 330 are ON/OFF soft keys 561, 562, 563 that allow the user to control access to his/her playlist, and to enable streaming and Bluetooth®. Each switch is a toggle. Touching a switch that bears the label ON will disable the function controlled by the switch and change the label on the switch to OFF; and touching a switch that bears the label OFF will enable the function controlled by that switch and change the label to ON.

Numerous variations may be practiced in the embodiments depicted above. For example, the invention may be practiced with any form of listening experience. While music selections are likely to be most popular, the listening experiences may include audio books, drama, lectures and other instructional material, commentary, descriptions of sports events, and most of the experiences that have attracted radio audiences for years. The invention also makes it possible to reach selected groups of people with distinctive listening content in circumstances where the distinctive contents might otherwise have "drowned" each other out. For example, different streams of music might be provided to different listeners at a gym or other public assembly. Different shopping information might be provided to different shoppers in a department store or mall. Different instructions might be given to different students assembled in a common meeting room. Numerous other examples will be evident in view of the foregoing.

As will be apparent to those skilled in the art, numerous other variations may be practiced within the spirit and scope of the present invention.

What is claimed is:

1. A method of operating a first wireless communication device having a transmitter and a receiver comprising
    storing electronically in a memory in the device a plurality of digital files received at the receiver wherein the digital files are listening and/or viewing experiences;
    generating from the memory signals representing a first listening and/or viewing experience of a selected digital file;
    providing the signals both to an audio and/or visual ("audio/visual") output from the first wireless communication device for use by a first user and to the transmitter for transmission to a second wireless communication device for use at the same time in a second audio/visual output of the second wireless communication device by a second user so that the second user can listen to and/or view the portion of the first listening and/or viewing experience that remains at the time that the second user selects to listen to and/or view the first listening and/or viewing experience without first downloading the signal representing the first listening and/or viewing experience to the second wireless communication device such that the first user and the second user listen to and/or view the same listening and/or viewing experience at substantially the same point in time in the listening and/or viewing experience;
    generating from the memory signals representing a second listening and/or viewing experience of a selected digital file that is different from the first listening and/or viewing experience; and
    providing the signals representing the second listening and/or viewing experience at substantially the same time to the transmitter for transmission to a third wireless communication device for use at the same time in a third audio/visual output of the third wireless communication device by a third user so that the third user can listen to and/or view the second listening and/or viewing experience that is different from the first listening and/or viewing experience being listened to and/or viewed at the same time by the first and second users.

2. The method of claim 1 wherein at least some of the digital files stored in the first device are listening experiences such as songs.

3. The method of claim 1 wherein the signals provided to the transmitter are streamed.

4. The method of claim 1 further comprising the step of generating a list of digital files stored in the memory and transmitting the list from the transmitter.

5. The method of claim 4 further comprising the step of receiving at the first device a selection by another user of one of the digital files on the list of digital files and in response to such selection providing to the transmitter signals representing the second listening and/or viewing experience of the selected digital file.

6. The method of claim 1 wherein the first wireless communication device is portable.

7. At least three wireless communication devices, each device including a transmitter, a receiver, and an audio and/or visual output ("audio/visual") output, each said device storing software for:
    storing electronically in a memory in the device a plurality of digital files received at the receiver wherein the digital files are listening and/or viewing experiences;
    generating from the memory signals representing a first listening and/or viewing experience of a selected digital file; and
    providing the signals both to the audio/visual output from the device for use by a first user and to the transmitter for transmission to a second of the wireless communication devices for use at the same time in an audio/visual output of the second wireless communication device by a second user so that the second user can listen to and/or view the portion of the first listening and/or viewing experience that remains at the time that the second user selects to listen to and/or view the first listening and/or viewing experience without first downloading the signal representing the first listening and/or viewing experience to the second wireless communication device such that the first user and the second user listen to and/or view the same listening and/or viewing experience at substantially the same point in time in the listening and/or viewing experience;
    generating from the memory signals representing a second listening and/or viewing experience of a selected digital file that is different from the first listening and/or viewing experience; and
    providing the signals representing the second listening and/or viewing experience at substantially the same time to the transmitter for transmission to a third of the wireless communication devices for use at the same time in a third audio/visual output of the third wireless communication device by a third user so that the third user can listen to and/or view a second listening and/or viewing experience that is different from the first listening and/or viewing experience being listened to and/or viewed at the same time by the first and second users.

8. The devices of claim 7 wherein at least some of the digital files stored in the first device are listening experiences such as songs.

9. The devices of claim 7 wherein the signals provided to the transmitter are streamed.

10. The devices of claim 7 further comprising mobile application software for generating a list of digital files stored in the memory and transmitting the list from the transmitter.

11. The devices of claim 10 further comprising mobile application software for receiving at the first device a selection by another user of one of the digital files on the list of digital files and in response to such selection providing to the transmitter signals representing the second listening and/or viewing experience of the selected digital file.

12. The devices of claim 7 wherein the transmitter is a Bluetooth®, or Wi-Fi transmitter.

13. The device of claim 7 wherein the communication device is portable.

14. A method of operating a wireless network comprising at least three portable wireless devices, each wireless device including a transmitter, a receiver, and an audio and/or visual output ("audio/visual") output, the method comprising:
    storing electronically in a memory in a first portable wireless device a plurality of digital files received at the receiver of the first wireless device wherein the digital files are listening and/or viewing experiences;
    generating from the memory of the first wireless device signals representing a first listening and/or viewing experience of a selected digital file;
    providing the signals both to the audio/visual output from the first wireless device for use by a user of that wireless device and to the transmitter of the first wireless device for transmission to a second of the wireless devices for use at the same time by a user of that second wireless device;
    generating from the memory of the first wireless device signals resenting a second listening and/or viewing experience of a selected digital file that is different from the first listening and/or viewing experience;
    providing the signals representing the second listening and/or viewing experience to the transmitter of the first wireless device for transmission to a third of the wireless devices for use at the same time by a user of that third wireless device;
    receiving at a second receiver of the second wireless device signals transmitted from the first wireless device and providing to a second audio/visual output of the second wireless device the received signals that were transmitted from the first wireless device so that the second user can listen to and/or view the portion of the first listening and/or viewing experience that remains at the time that the second user selects to listen to and/or view the first listening and/or viewing experience without first downloading the signal representing the first listening and/or viewing experience to the second wireless communication device such that the first user and the second user listen to and/or view the same listening and/or viewing experience at substantially the same point in time in the listening and/or viewing experience; and
    receiving at a third receiver of the third wireless device signals transmitted from the first wireless device representing a second listening and/or viewing experience that is different from the first listening and/or viewing experience and providing to a third audio/visual output of the third wireless device the received signals that were transmitted from the first wireless device so that the third user can listen to and/or view the second listening and/or viewing experience that is different from the first listening and/or viewing experience being listened to and/or viewed at the same time by the first and second users.

15. The method of claim 14 wherein at least some of the digital files stored in the memories of the two wireless devices are listening experiences such as songs.

16. The method of claim 14 wherein the signals are streamed.

17. The method of claim 14 further comprising generating a list of digital files stored in the memory of the first of the wireless devices and transmitting the list from the transmitter of the first of the devices to the receivers of the other devices.

18. The method of claim 17 further comprising software for receiving at the first of the wireless devices from the third of the wireless devices a selection by the third user of one of the digital files on the list of digital files and in response to such selection providing to the transmitter of the first of the wireless devices signals representing the second listening and/or viewing experience.

19. The method of claim 14 wherein the transmitter is a Bluetooth®, or Wi-Fi transmitter.

20. The method of claim 14 wherein the digital files are listening experiences such as songs.

21. The method of claim 14 wherein a digital file contains listening experiences, graphic images, and/or text.

22. A wireless network comprising at least three portable, wireless devices,
- a first wireless device comprising a first transmitter, a first receiver, a first audio and/or visual output ("audio/visual") output and first software that configures the first device for:
- storing electronically in a first memory in the first device a plurality of digital files received at the first receiver wherein the digital files are listening and/or viewing experiences;
- generating from the first memory signals representing a first listening and/or viewing experience of a selected digital file;
- providing the signals both to the first audio/visual output for use by a first user of the first device and to the first transmitter for transmission to a second wireless device for use at the same time by a second user;
- generating from the memory signals representing a second listening and/or viewing experience of a selected digital file that is different from the first listening and/or viewing experience;
- providing the signals representing the second listening and/or viewing experience at substantially the same time to the transmitter for transmission to a third wireless communication device for use at the same time in a third audio/visual output of the third wireless communication device by a third user; and
- receiving at the first receiver signals transmitted from a wireless device;
- the second wireless device comprising a second transmitter, a second receiver, a second audio/visual output and second software that configures the second device for:
- receiving at the second receiver of the second wireless device signals transmitted from the first wireless device and providing to the second audio/visual output the received signals that were transmitted from the first wireless device so that the second user can listen to and/or view the portion of the first listening and/or viewing experience that remains at the time that the second user selects to listen to and/or view the first listening and/or viewing experience without first downloading the signal representing the first listening and/or viewing experience to the second wireless communication device such that the first user and the second user listen to and/or view the same listening and/or viewing experience at substantially the same point in time in the listening and/or viewing experience; and
- the third wireless device comprising a third transmitter, a third receiver, a third audio/visual output and third software that configures the third device for:
- receiving at the third receiver of the third wireless device signals transmitted from the first wireless device representing a second listening and/or viewing experience that is different from the first listening and/or viewing experience and providing to the third audio/visual output the received signals that were transmitted from the first wireless device so that the third user can listen to and/or view the second listening and/or viewing experience that is different from the first listening and/or viewing experience being, listened to and/or viewed at the same time by the first and second users.

23. The network of claim 22 wherein the first software comprises software for:
- generating a list of digital files stored in the first memory,
- transmitting the list from the first transmitter to the third receiver,
- receiving at the first receiver a selection by the third user of one of the digital files on the list of digital files, and
- in response to such selection providing to the first transmitter signals representing the second listening and/or viewing experience of the selected digital file for transmission to the third wireless device.

24. The network of claim 22 wherein the digital files are listening experiences such as songs.

25. The network of claim 22 wherein at least some of the digital files stored in the first and second memories contain listening experiences, graphic images, and/or text.

* * * * *